US012112090B1

(12) United States Patent
Harris

(10) Patent No.: US 12,112,090 B1
(45) Date of Patent: *Oct. 8, 2024

(54) VISUAL DISPLAY SYSTEM

(71) Applicant: Beth Harris, Arrington, TN (US)

(72) Inventor: Beth Harris, Arrington, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,106

(22) Filed: Sep. 14, 2021

Related U.S. Application Data

(63) Continuation of application No. 16/451,016, filed on Jun. 25, 2019, now Pat. No. 11,119,721.

(60) Provisional application No. 62/775,953, filed on Dec. 6, 2018, provisional application No. 62/689,280, filed on Jun. 25, 2018.

(51) Int. Cl.
| | |
|---|---|
| *G06F 3/147* | (2006.01) |
| *G06F 3/14* | (2006.01) |
| *G06Q 20/20* | (2012.01) |
| *G09G 5/14* | (2006.01) |

(52) U.S. Cl.
CPC ............ *G06F 3/147* (2013.01); *G06F 3/1423* (2013.01); *G06Q 20/209* (2013.01); *G09G 5/14* (2013.01); *G09G 2300/023* (2013.01); *G09G 2340/14* (2013.01); *G09G 2340/145* (2013.01); *G09G 2370/04* (2013.01); *G09G 2370/06* (2013.01); *G09G 2380/06* (2013.01)

(58) Field of Classification Search
CPC ..... G06F 3/147; G06F 3/1423; G06Q 20/209; G09G 5/14; G09G 2300/023; G09G 2340/14; G09G 2340/145; G09G 2370/04; G09G 2370/06; G09G 2380/06
See application file for complete search history.

(56) References Cited

U.S. PATENT DOCUMENTS

| | | | | |
|---|---|---|---|---|
| 2009/0259516 A1* | 10/2009 | Zeevi | ................. | G06Q 30/0255 705/14.53 |
| 2011/0153393 A1* | 6/2011 | Raff | .................... | G06Q 30/0268 705/7.42 |

* cited by examiner

*Primary Examiner* — Adam R. Giesy
(74) *Attorney, Agent, or Firm* — Wayne Edward Ramage; Baker Donelson

(57) ABSTRACT

A system including a secondary visual digital display on the customer-facing side of a cash register or point-of-sale terminal display. The customer-facing digital display presents advertising content, videos, informational content, or any other form of content that the business or location owner or operator would like to have displayed to customers. An application program, as described below, is stored and/or loaded on memory storage in the secondary display and run by a microprocessor in the secondary display, or alternatively, is stored and/or loaded on a separate device, and run by a microprocessor in the secondary display or in the separate device. The content may be displayed based upon context. The content can be programmed and managed by the business or location owner or operator, by a third party service that creates and provides content for sale to business/location owners and operators, or by a third party service/operator that manages a system (including, but not limited to, the obtaining and downloading of content) as part of a negotiated contract with the owner or operation of a business or location (or multiple businesses or locations).

18 Claims, 10 Drawing Sheets

VISUAL DISPLAY SYSTEM

This application is a continuation of U.S. patent application Ser. No. 16/451,016, filed Jun. 25, 2019, which claims priority to and benefit of U.S. Provisional Applications Nos. 62/689,280, filed Jun. 25, 2018, and 62/775,953, filed Dec. 6, 2018, all of which are incorporated herein in their entireties by specific reference for all purposes.

FIELD OF INVENTION

This invention relates to a system and related methods for a secondary visual digital display on the customer-facing side of a cash register or point-of-sale terminal display or computer monitor.

SUMMARY OF INVENTION

In various exemplary embodiments, the present invention comprises a secondary visual digital display on the customer-facing side of a cash register or point-of-sale terminal display. The digital display may be an LED (light emitting diode) screen, LCD (liquid crystal display) screen or other form of digital display screen, and is attached to, or arranged proximate to, the back side (i.e., customer-facing side) of a display associated with a point-of-sale terminal or register, concessions register or stand, or similar computer monitor in various locations as described below. A plurality of customer-facing digital displays may be provided, corresponding to the number of POS terminals or monitors used at the location (i.e., each terminal or monitor has a matching customer-facing digital display). In some embodiments, multiple secondary displays may be associated with a single POS terminal or monitor.

The customer-facing digital display presents advertising content, videos, informational content, or any other form of content that the business or location owner or operator would like to have displayed to customers. An application program, as described below, is stored and/or loaded on memory storage in the secondary display and run by a microprocessor in the secondary display, or alternatively, is stored and/or loaded on a separate device, and run by a microprocessor in the secondary display or in the separate device. Examples of control and/or communications methods and devices include, but are not limited to, a USB or similar port compatible device (e.g., stick or dongle), a media player, a power-over-ethernet device, video or TV box or streaming device, television broadcast, direct satellite broadcast, Internet transmission (e.g., TCP/IP), or another computer networking means of video, still picture, and/or audio transmission.

The content may be displayed based upon context. The content can be programmed and managed by the business or location owner or operator, by a third party service that creates and provides content for sale to business/location owners and operators, or by a third party service/operator that manages a system (including, but not limited to, the obtaining and downloading of content) as part of a negotiated contract with the owner or operation of a business or location (or multiple businesses or locations).

The business or location owner or operator may have the customer-facing displays connected (wired or wirelessly) to their own system for content and programming. Alternatively, the customer-facing displays may be kept separate from the business network or system, and may be on a dedicated network or system (which may be in the store/location or remote) providing content and programming. In one embodiment, a "black box" data hub is provided to plug into and interface with the business/location's host system. In yet a further embodiment, a separate wifi guest account may be purchased by the service provider or business/location owner/operator for the purposes of supplying internet access to the displays.

DETAILED DESCRIPTION OF EXEMPLARY EMBODIMENTS

Figure 1C:
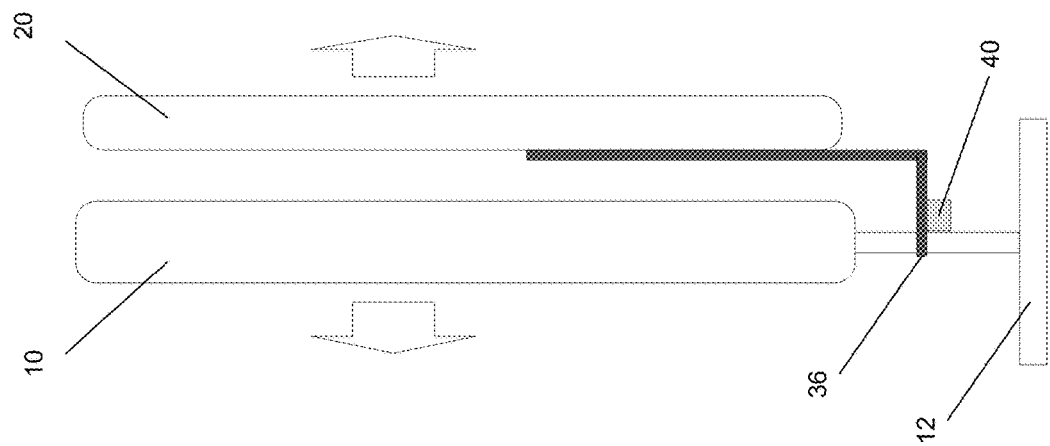
FIGS. 1A-C show side views of various system configurations in accordance with exemplary embodiments of the present invention.
Figure 1B:
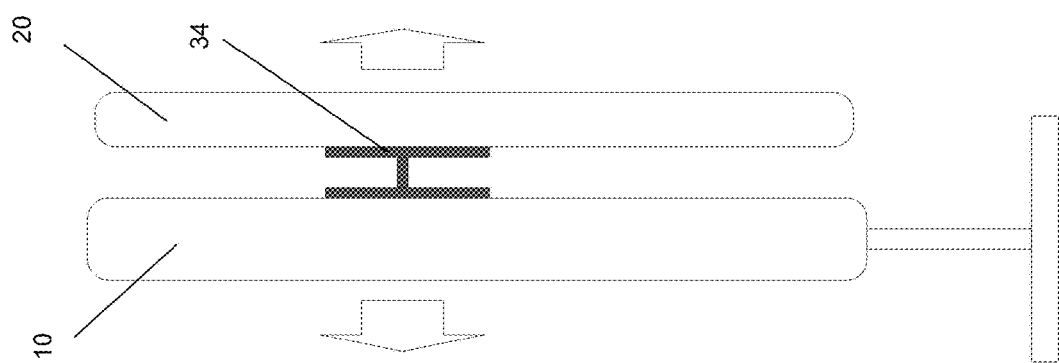
Figure 1A:
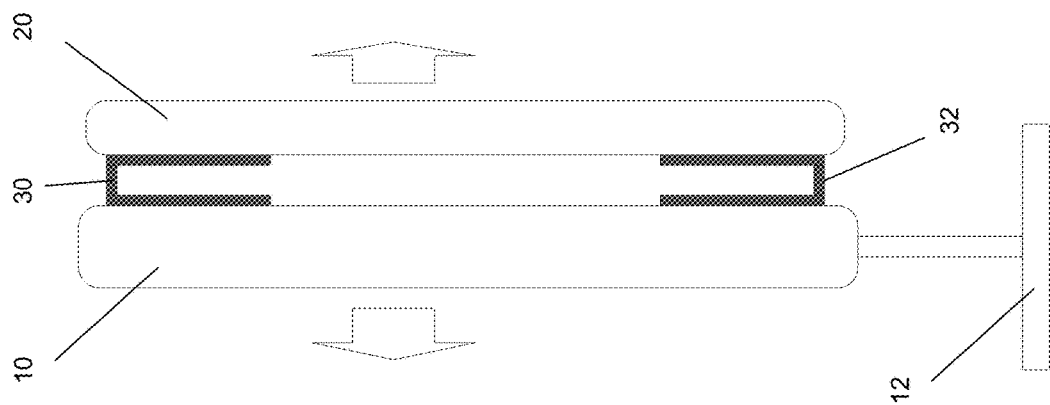
Figure 2:
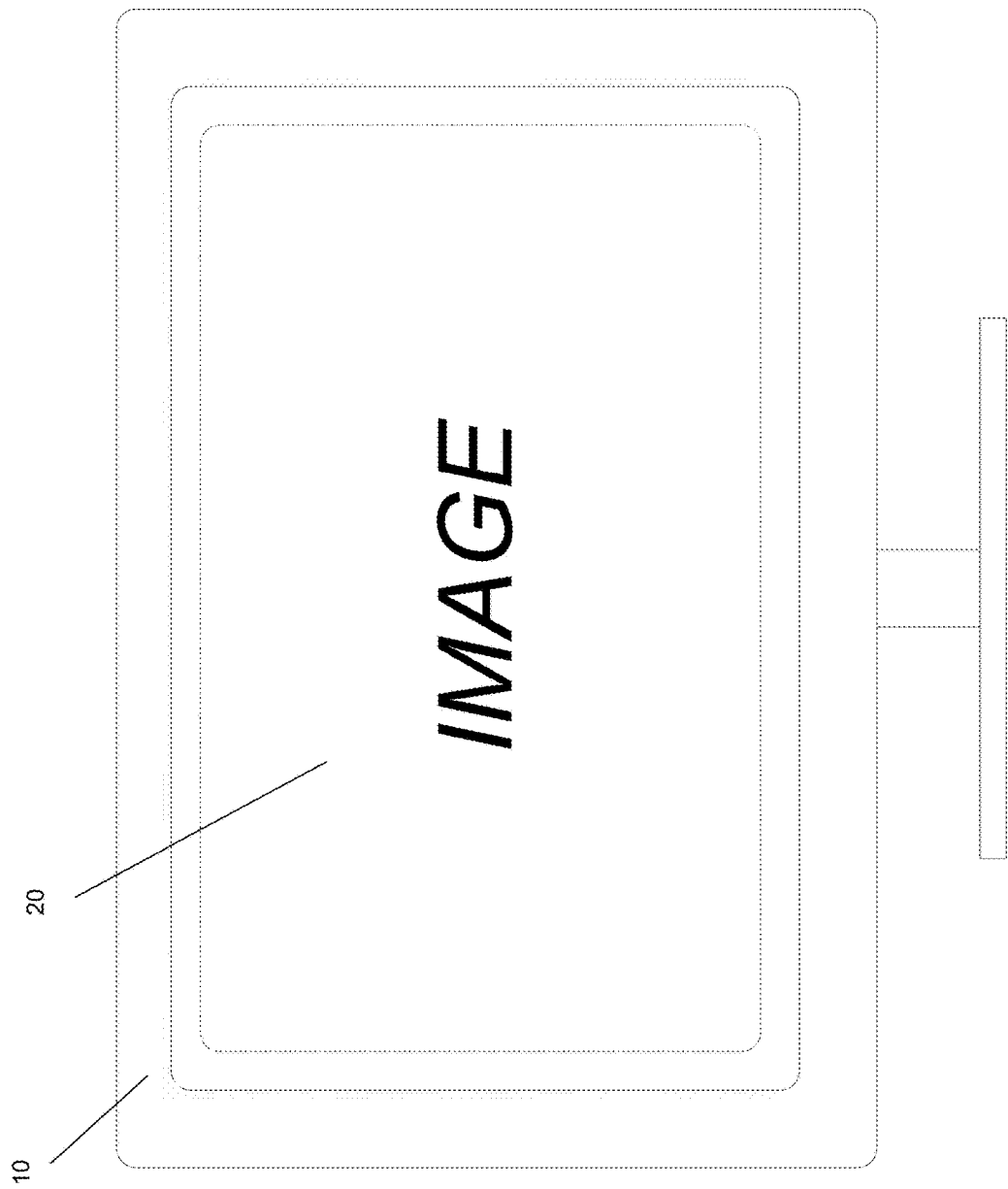
FIG. 2 shows a view of a secondary display mounted on the back of a point-of-sale terminal display in accordance with an exemplary embodiment of the present invention.
Figure 3:
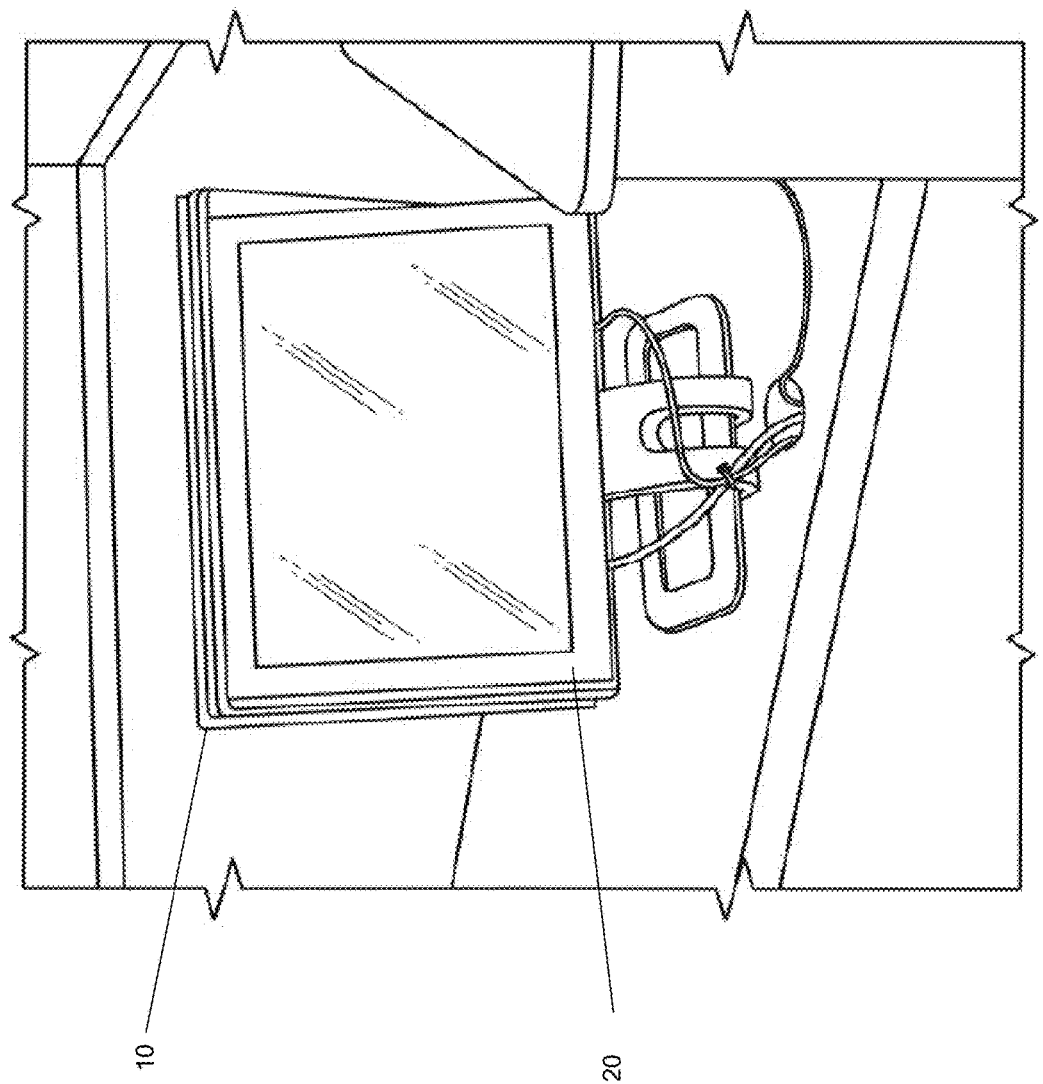
FIG. 3 shows another view of a secondary display mounted on the back of a point-of-sale terminal display or computer monitor.
Figure 4:
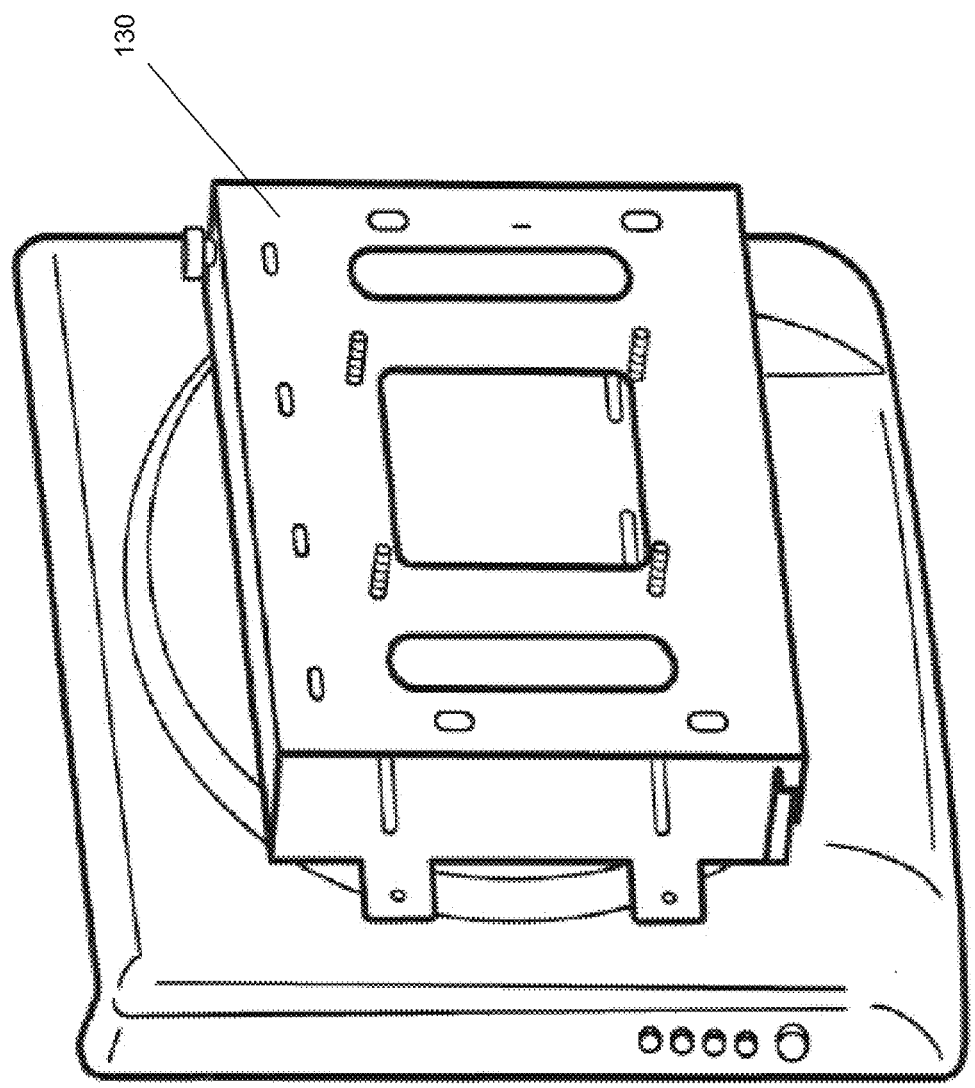
FIG. 4 shows an example of a mounting bracket installed on the back of a visual display.
Figure 5:
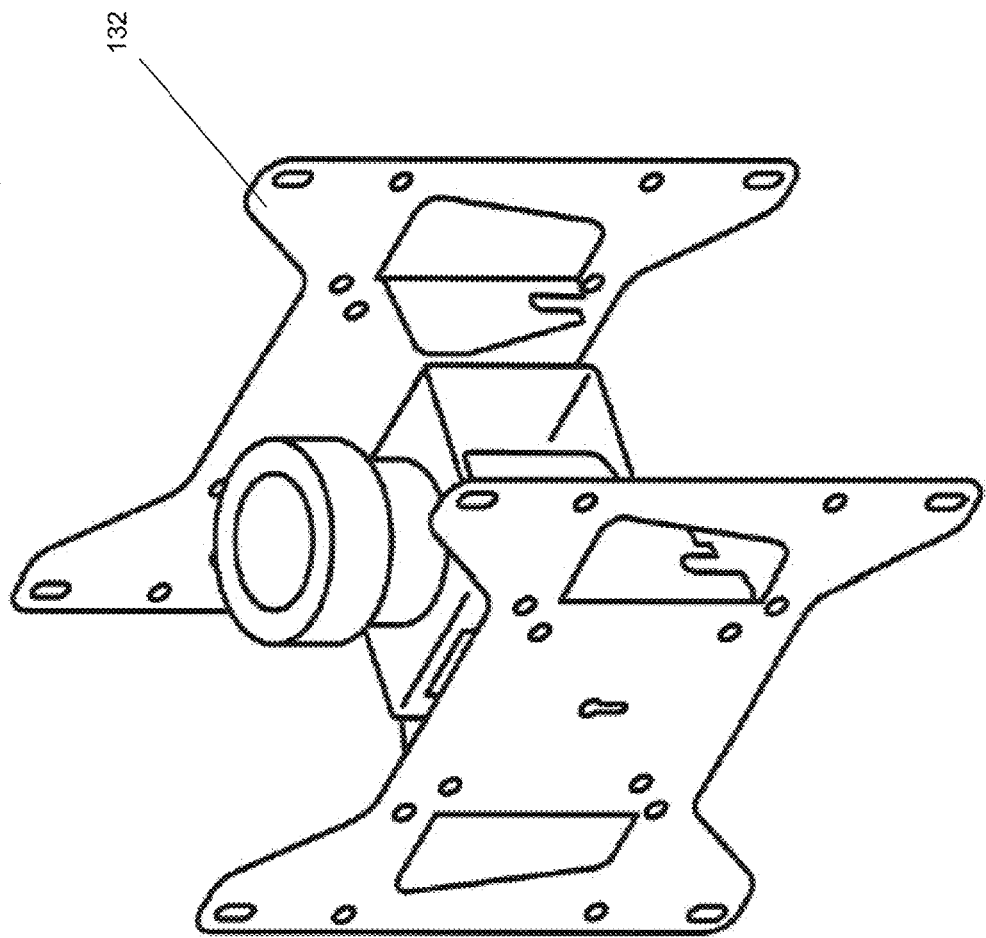
FIG. 5 shows an example of another embodiment of a mounting bracket.
Figure 6A:
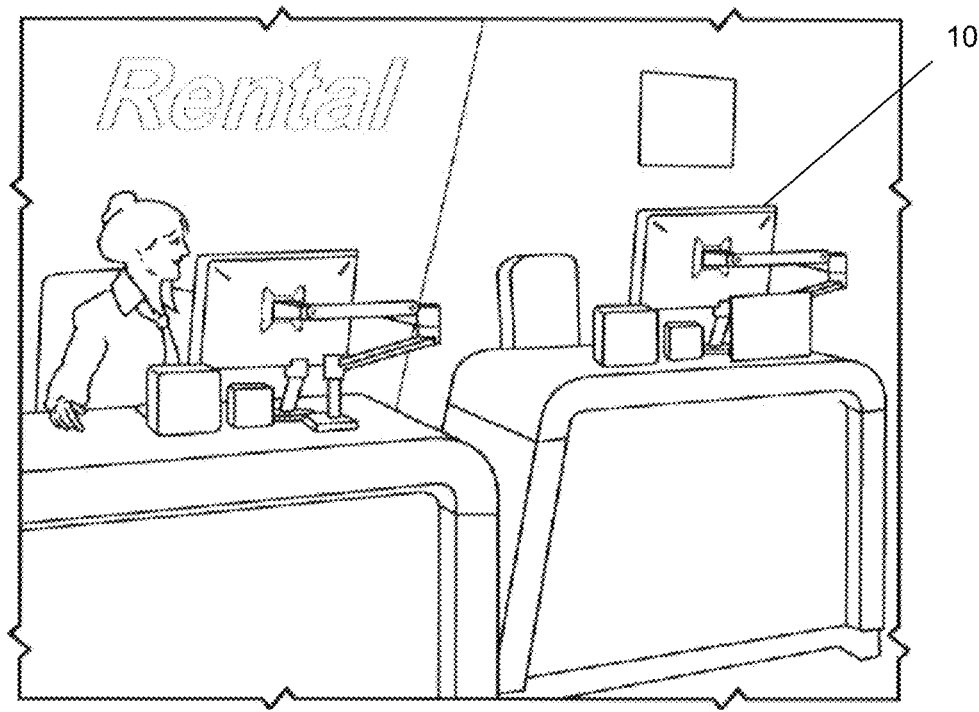
FIGS. 6A-B show a comparison of vehicle rental counters without (6A) and with (6B) secondary displays.
Figure 6B:
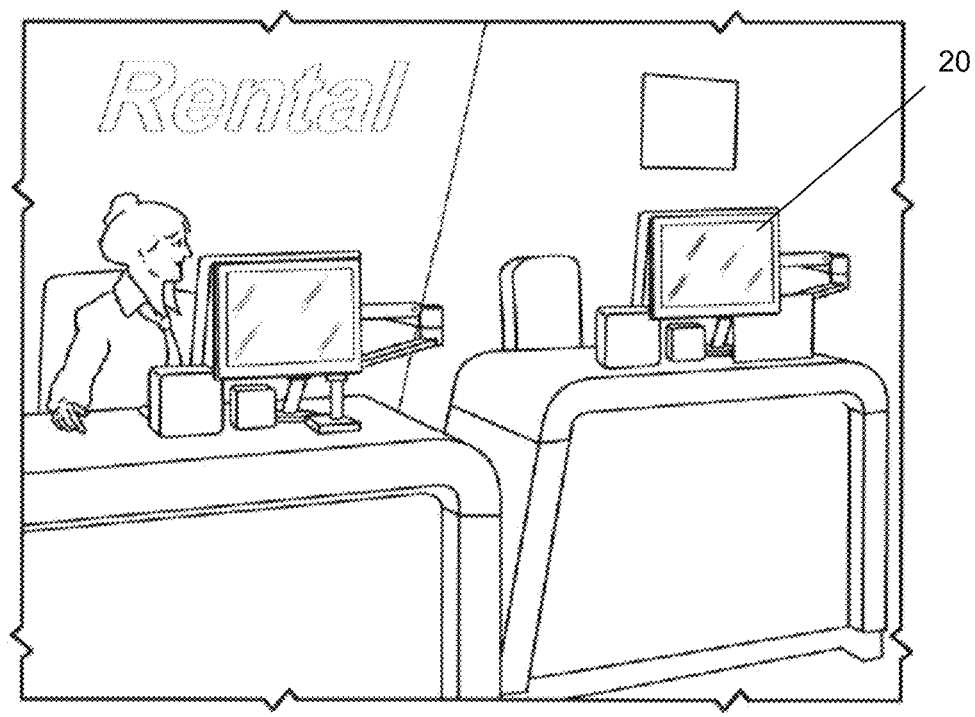
Figure 7:
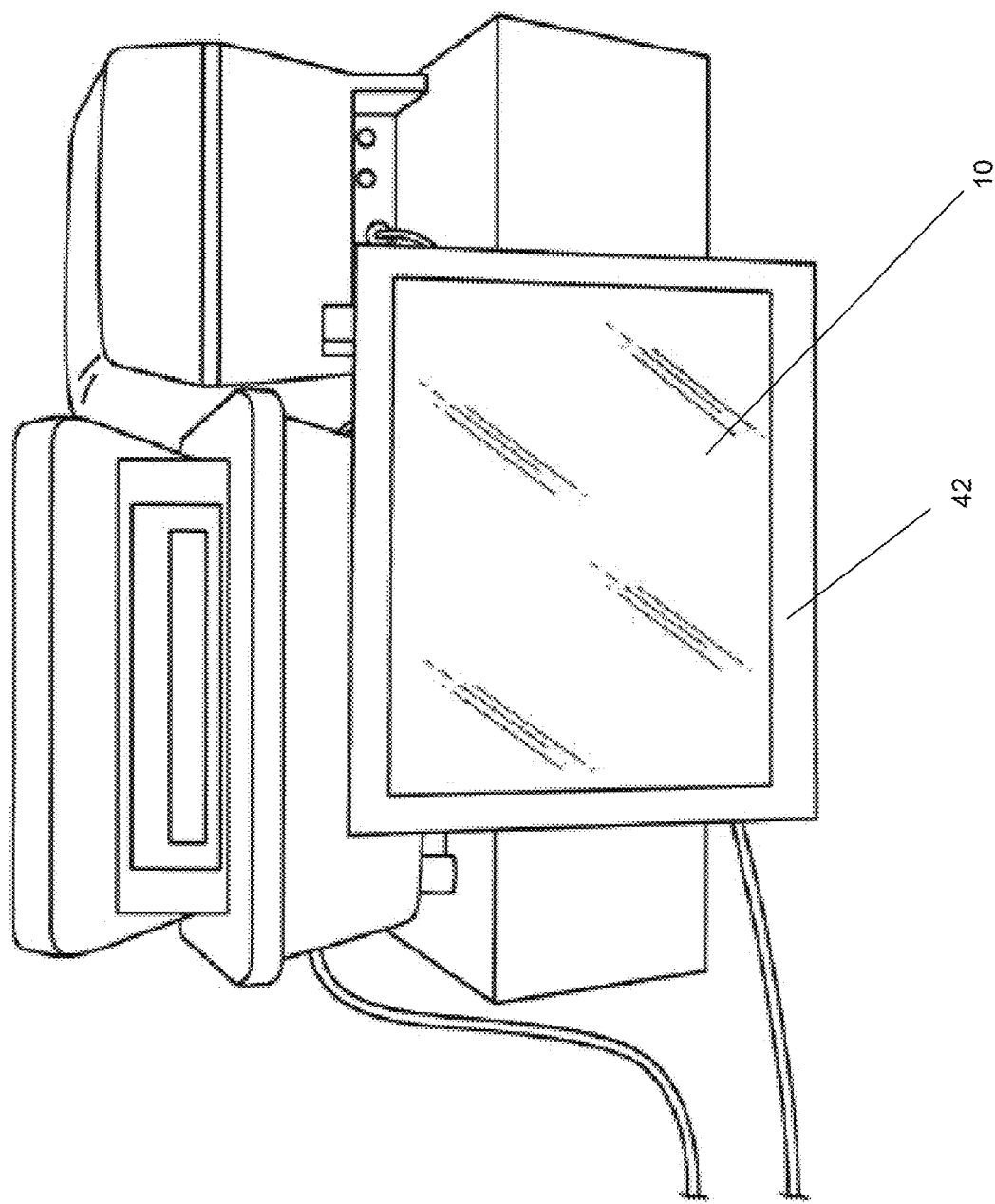
FIG. 7 shows an example of a point-of-sale station with an independent secondary display.

In various exemplary embodiments, as seen in FIGS. 1-3, the present invention comprises a secondary visual digital display 20 on the customer-facing side of a cash register or point-of-sale terminal display 10. The digital display may be an LED (light emitting diode) screen, LCD (liquid crystal display) screen or other form of digital display screen, and is attached to, or arranged proximate to, the back side (i.e., customer-facing side) of a display associated with a point-of-sale terminal or register, concessions register or stand, or similar computer monitor in retail and other stores, restaurants, bar, pub, lounge, service-providers, hospitals, clinics, doctor's offices, emergency rooms, airport service locations, theaters, concerts, festivals, arenas, coliseums, stadiums, forums, convention centers, amphitheaters, gardens, any sports or entertainment or music venue or facility, or any location where an employee operates a terminal with a monitor or display with a back facing the customer. Further examples include, but are not limited to, free-standing concessions register at a sports or entertainment venue, counter-top concessions registers, registration computer or monitor at a seminar/conference, office monitor, retail point-of-sale, office desk, healthcare or medical facility registration or check-out desk, airport terminal or ticket counter or kiosk, airport boarding gate, and/or rental car counter or kiosk.

A plurality of customer-facing digital displays may be provided, corresponding to the number of POS terminals or monitors used at the location (i.e., each terminal or monitor has a matching customer-facing digital display). In some embodiments, multiple secondary displays may be associated with a single POS terminal or monitor.

The customer-facing digital display presents advertising content, videos, informational content, or any other form of content that the business or location owner or operator would like to have displayed to customers. Sound may or may not also be projected as part of the content, or independently from the content. An application program, as described below, is stored and/or loaded on memory storage in the secondary display and run by a microprocessor in the secondary display, or alternatively, is stored and/or loaded on a separate device, and run by a microprocessor in the secondary display or in the separate device. Examples of control and/or communications methods and devices include, but are not limited to, a USB or similar port compatible device (e.g., stick or dongle), a media player, a power-over-ethernet device, video or TV box or streaming device, television broadcast, direct satellite broadcast, Internet transmission (e.g., TCP/IP), or another computer networking means of video, still picture, and/or audio transmission.

The content may be displayed based upon context. The content can be programmed and managed by the business or location owner or operator, by a third party service that creates and provides content for sale to business/location owners and operators, or by a third party service/operator that manages a system (including, but not limited to, the obtaining and downloading of content) as part of a negotiated contract with the owner or operation of a business or location (or multiple businesses or locations).

The business or location owner or operator may have the customer-facing displays connected (wired or wirelessly) to their own system for content and programming. Alternatively, the customer-facing displays may be kept separate from the business network or system, and may be on a dedicated network or system (which may be in the store/location or remote) providing content and programming. In one embodiment, a "black box" data hub is provided to plug into and interface with the business/location's host system. In yet a further embodiment, a separate wifi guest account may be purchased by the service provider or business/location owner/operator for the purposes of supplying internet access to the displays.

Regardless of configuration, there are multiple options for content management and control. Management and control may be through a third-party service provider that provides equipment, original content, and services to a business/location owner or operator. Alternatively, a third-party service provide may help manage the content, but the content is created and owned by the business/location owner or operator (or other entity). In yet another embodiment, the system includes software applications designed to allow the displays to connect to the business/location owner or operator's host system and thereby control and manage their own content. In a further embodiment, a third party service/operator manages a system (including, but not limited to, the obtaining and downloading of content from various sources, such as corporate advertisers or sponsors) as part of a negotiated contract with the owner or operation of a business or location (or multiple businesses or locations).

In one exemplary embodiment, the content being displayed is dynamic, and can be based upon the customer's interaction with the employee at the business/location terminal. For example, as items being purchased are recognized and entered in a POS terminal, the corresponding customer-facing display may show related products or items or services.

Figure 9:
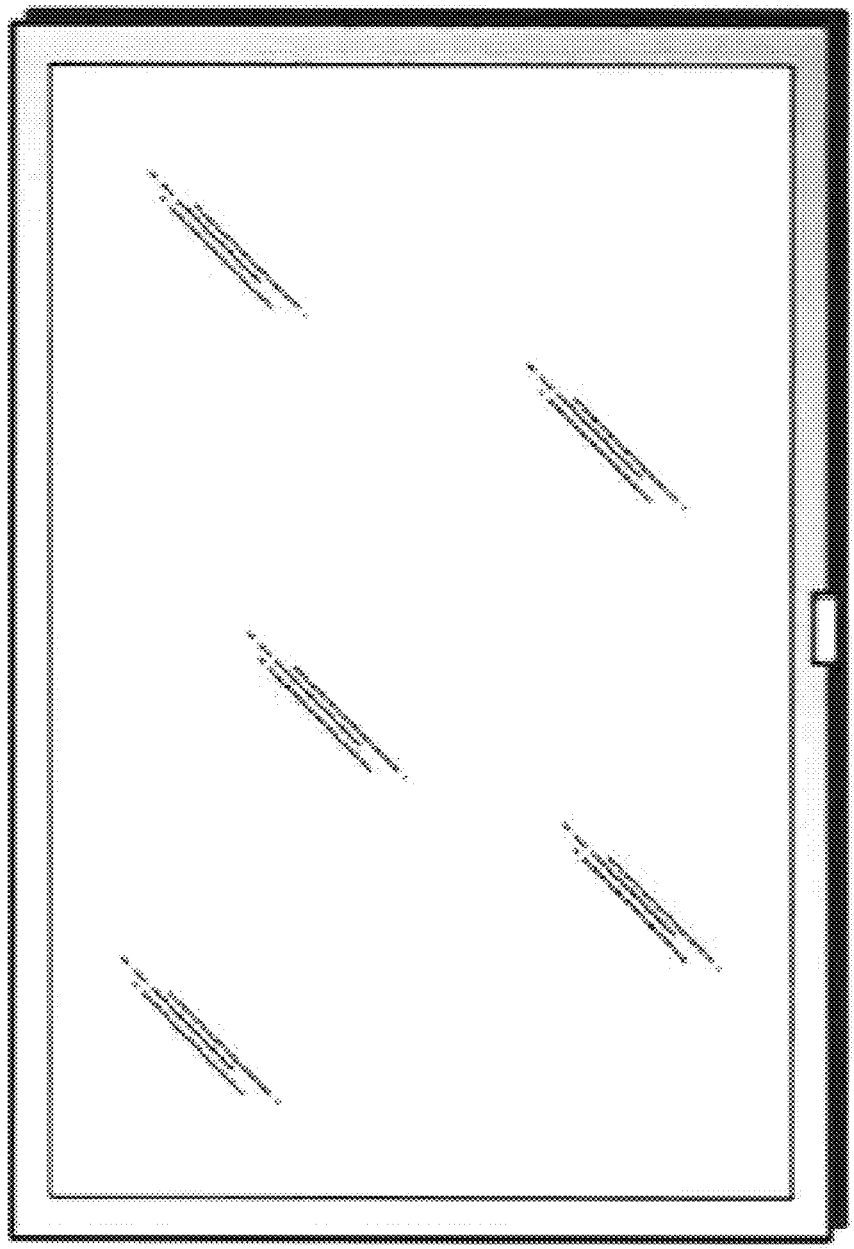

The size, weight, and configuration of the customer-facing screen may vary, depending on the business/location's needs and size and configuration of the existing monitors/terminals. In one embodiment, as seen in FIG. 9, the secondary screen is an LED or LCD screen with USB connection (either directly or through the POS terminal) to the host computing system on site. The USB connection may provide power to the display; alternatively, power may be provided through Power over Ethernet means, or the display may be directly plugged into an electrical plug as a power source.

Figure 8:
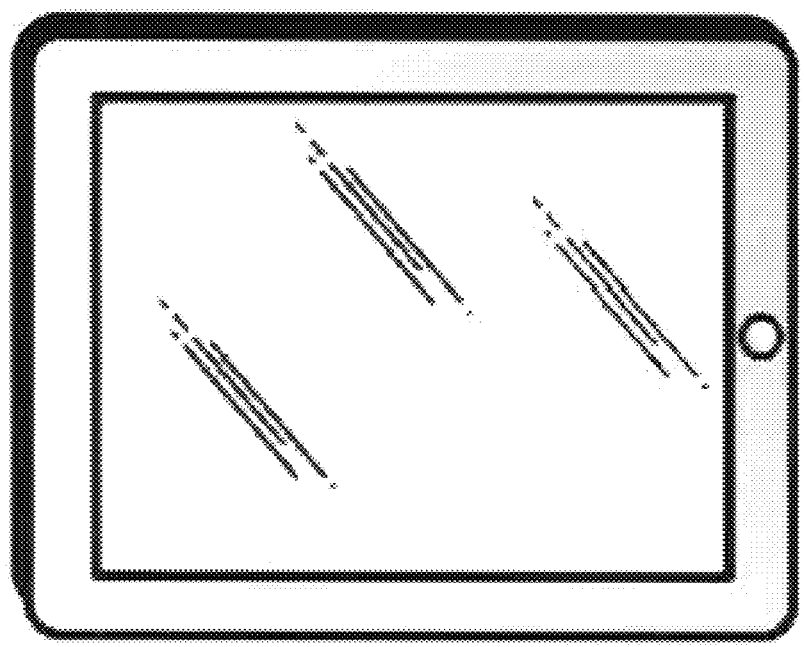
FIGS. 8 and 9 show examples of secondary displays.

In an alternative embodiment, a tablet computing device, as seen in FIG. 8, can be used as the customer-facing screen. Content may be managed through an application (e.g., a signage software program) on the tablet control by one or more of the entities identified above. Power to the tablet may be through a standard AC adaptor or power cord, and the tablet may be connected or attached as described below.

A variety of connection/attachment means or mechanisms may be used to securely attach the customer-facing screen 20 to the back of, or proximate to the back of, the existing monitor/terminal 10. The customer facing screen may be connected directly to the corresponding monitor/terminal, or indirectly, such as to a stand or platform. Examples of connection means 30, 32, 34, 36, 130, 132 include, but are not limited to, mounting plates, mounting brackets, pole mounts, stand mounts, mounting plates with rotating arms, hook-and-loop attachment devices or strips, magnetic attachment means, tablet enclosure, and the like. Connection means may provide attachment at the top and/or bottom (FIG. 1A), and/or middle (FIG. 1B) of the respective displays. In some cases, the secondary display may be attached to the POS or computer monitor stand 12. In some locations, the display screen may be secured in place so it is not easily removed, such as by use of a lock 40 or secure lockable case, enclosure, mount or frame 42. Thus, for example, the screen may be securely mounted to a wall, desk, sink, or another surface in an office, hallway, bathroom, or other publicly accessible area.

In several embodiments, the secondary display is removable attachable, and thus can be "retro-fit" to pre-existing POS register/terminal or similar system. In an alternative embodiment, the secondary display is integrated or built into the POS register/terminal as a second screen, or as a double-sided screen display facing in opposite directions, with the displays operating independently of each other.

As can be seen in FIGS. 1A-C, in several embodiments, the POS/primary display screen and the secondary display cannot be seen by a user or viewer at the same time. Accordingly, the viewer (i.e., first viewer) of the POS/primary display screen will not be distracted by videos or images on the secondary display, and the viewer (i.e., second viewer) of the secondary screen (e.g., a customer) will not be able to see the POS/primary display. In some embodiments, the secondary screen may be dimmed or blanked when the two viewers are actively communicating or engaging in a transaction, so as to avoid distracting the secondary display viewer (e.g., customer) at those times. In one embodiment, a microphone or microphones, such as directional microphones, may be located so as to detect when the first viewer and/or the second viewer are speaking to each other, and then dim or blank the secondary display while speech is detected, and a short time after the last spoken sound detected (e.g., 5 to 10 seconds). Similarly, if sound is projected by or in conjunction with the secondary display screen, the sound may be lowered or cut-off when speech is detected, and a short time thereafter, as described above. In alternative embodiments, the first viewer may have a control for the temporary dimming/blanking or lowering/cut-off functions described above, usable only when a second viewer is detected by the system proximate the first viewer and the secondary display screen. The sound may be lowered/cut-off independently of the dimming or blanking of the secondary display screen. In some embodiments, the secondary display screen may comprise directional speakers or sound reproduction devices, so as to limit audible sound in a restricted area in front of the secondary display screen, thereby preventing the first user from being distracted by sound from the secondary display screen.

Figure 10:
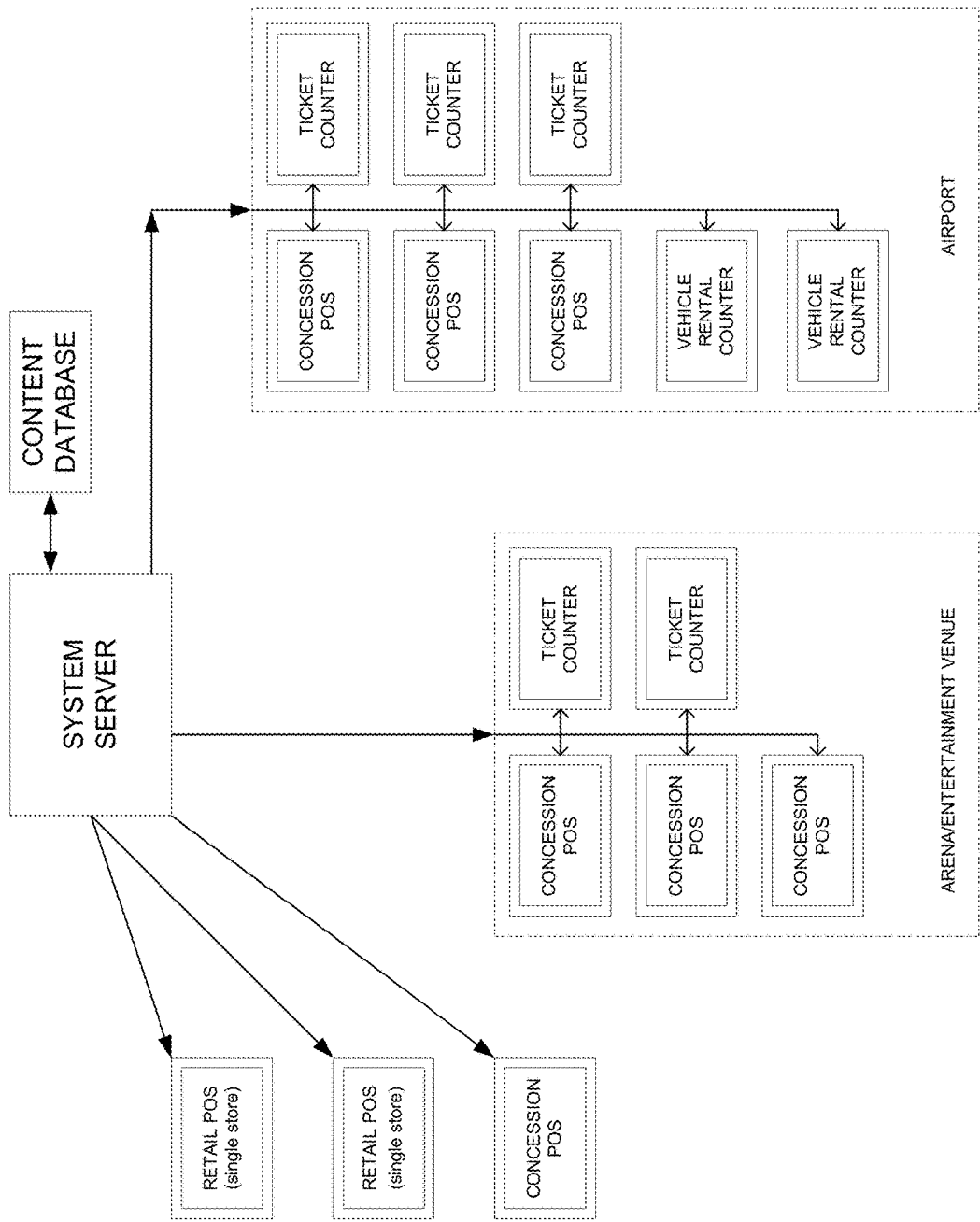
FIG. 10 shows an example of a networked system in accordance with an exemplary embodiment of the present invention.

In one exemplary embodiment, as seen in FIG. 10, the system comprises a remote server or servers in electronic communication with a plurality of above-described secondary displays through a public or private network, such as, but not limited to, the Internet (e.g., the "cloud"). The remote server(s) are in communication with a database for storing advertising and other content as described above, and for storing an application program for operation by one or more microprocessors. The application program is operable to create, edit, remove, load, and manage content in the database, including playlists and supporting content send via the network to the secondary displays. Each secondary display in the system has a unique identification code, number or name, and secondary displays may also be grouped by various parameters, including, but not limited to, content display type, playlist type, type of display, location, type of location, type of business, name of business, type of POS/ primary display screen associated with each display, and other similar features. A user at the central server thus can configure playlists of pre-selected content from the database for individual screens (i.e., screen by screen) or for groups of screens at the same time. Thus, a single playlist and supporting content may be communicated electronically (via wired or wireless communication, or via manual upload through a USB-compatible device, as discussed above) to a single or multiple secondary displays, for loading and storage on a computer storage device in electronic communication with a particular secondary display. Similarly, multiple playlists can be sent to the same secondary display, for differential running at particular times, on particular days, or for particular events (e.g., at a particular venue, playlist "1" is used for hockey games, playlist "2" is used for concerts, and playlist "3" is used for all other events).

Playback generally is controlled by the local application program, although, as discussed above, the central server may control playback on secondary displays with which it is in electronic communication over a network. Playlist playback parameters include, but are not limited to, start time, end time, continuous play, playlist sequencing, random play within a set list, and similar functions.

Secondary displays may be locally controlled by a local application program loaded on the local computer storage device associated with the display, and run by a local microprocessor in or associated with the display. The local application program receives the pre-selected content and then displays the content according to its programming. Display may be in accordance with default instructions in the local application program, or in accordance with specific instructions sent from the central server. The secondary display may be controlled remotely from the central server, including turning the secondary display on/off, turning the display of content on the secondary display on/off, or interrupting the display of the pre-determined content, such as to add additional programming, run live programming (such a sporting event or news program), or run an alert (such as a weather or traffic alert).

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, Power over Ethernet device or other Ethernet connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system, comprising:
    a remote content server in electronic communication with a network and a server computer storage device, said remote content server configured to receive updates to content stored thereon from one or more authorized users;
    a point-of-sale or business terminal or register with a front side and a back side, wherein the front side is viewable by a first viewer facing the front side, said terminal or register in electronic communication with the network;
    a secondary display positioned on or proximate to said back side, wherein the secondary display is positioned to be viewable by a second viewer facing the back side;
    a local computer storage device in electronic communication with the network, configured to store a playlist of pre-selected content; and
    a local microprocessor in electronic communication with the network, programmed to execute a local application program to cause the secondary display to display the playlist of pre-selected content, wherein the display of the playlist on the secondary display is independent of activity on the point-of-sale or business terminal or register;
    wherein the pre-selected content is periodically transmitted, over the computer network, to the local computer storage device from the remote content server.

2. The system of claim 1, wherein the secondary display is a digital display.

3. The system of claim 1, wherein the secondary display is an LED or LCD display screen.

4. The system of claim 1, wherein the secondary display is affixed to the point-of-sale or business terminal or register.

5. The system of claim 4, wherein the secondary display is locked to the point-of-sale or business terminal or register.

6. The system of claim 4, further comprising a bracket affixing the secondary display to the point-of-sale or business terminal or register.

7. The system of claim 1, wherein the pre-selected content is sent to the computer storage device by electronic communications from a remote server.

8. The system of claim 7, wherein the pre-selected content sent to the computer storage device includes content converted to a standard format.

9. The system of claim 1, wherein the pre-selected content comprises video or still-images, or both.

10. The system of claim 1, wherein point-of-sale or business terminal or register is located in a retail store, an airport, a concessions stand, a restaurant, a bar, or a sports, entertainment or music venue.

11. A system, comprising:
- a central computer server with a first microprocessor in electronic communication with a computer network and with a central database containing a plurality of content; and
- a plurality of remote secondary displays, each remote secondary display in electronic communication with the computer network and associated with a computer storage device and with a corresponding point-of-sale or business terminal or register with a front side and a back side, with a primary display positioned on the front side, wherein each remote secondary display is positioned on or proximate to the back side, and further wherein each remote secondary display is positioned to be viewable by a viewer facing the back side;
- wherein the first microprocessor is programmed to select, configure and send a playlist of pre-selected content selected from the plurality of content in the central database to each remote secondary display for storage on the corresponding local computer storage device and for display on the corresponding remote secondary display, wherein the display of the playlist of pre-selected content on the secondary display is independent of activity on the point-of-sale or business terminal or register.

12. The system of claim 11, wherein the same playlist is sent to two or more of said remote secondary displays.

13. The system of claim 11, wherein the plurality of remote secondary displays are grouped by one or more parameters.

14. The system of claim 13, wherein the parameters comprise one or more of location, type of location, type of business, or business name.

15. The system of claim 11, wherein multiple playlists are sent to a single remote secondary display.

16. The system of claim 11, wherein the playlist display parameters are controlled by the central server.

17. The system of claim 16, wherein the playlist display parameters comprise one or more of start time, end time, continuous play, sequence of content, random play of content.

18. The system of claim 16, wherein the playlist display parameters comprise one or more of addition of live programming or display of alerts.

* * * * *